June 22, 1971 S. MILLER 3,585,735

MAGNETIC TRACING BOX

Filed Aug. 27, 1968 2 Sheets-Sheet 1

INVENTOR.
SIDNEY MILLER
BY
SPARROW AND SPARROW
ATTORNEYS

June 22, 1971 S. MILLER 3,585,735

MAGNETIC TRACING BOX

Filed Aug. 27, 1968 2 Sheets-Sheet 2

INVENTOR.
SIDNEY MILLER
BY
SPARROW AND SPARROW
ATTORNEYS 3,585,735
Patented June 22, 1971

1

3,585,735
MAGNETIC TRACING BOX
Sidney Miller, 1098 E. 58th St.,
Brooklyn, N.Y. 11234
Filed Aug. 27, 1968, Ser. No. 755,581
Int. Cl. B43l 1/00
U.S. Cl. 35—66 6 Claims

ABSTRACT OF THE DISCLOSURE

A tracing box having a transparent surface, pulverulent material adapted to adhere to the surface of the box when the box is turned upside down and magnetically attractive means within the box operated by a magnet from without the box whereby the magnetically attractive means removes from its path the pulverulent material adhering to the surface of the box to form lines which are visible from the outside of the box and which may be wiped out by shaking the box upside down.

BACKGROUND OF THE INVENTION

The present invention relates to a tracing box upon which any type of indicia may be traced by the use of a magnetic implement.

Tracing boxes are known which rely on the use of mechanical means to trace indicia thereon. These boxes do not allow free expression by the user, since they are limited to stilted tracing in straight lines. The present invention seeks to overcome this drawback and provide a device for amusement or for use for advertising purposes.

SUMMARY OF THE INVENTION

The present invention is directed to a device which may be used for amusement while also having an educational value. The invention consists in such novel features, construction, arrangements and combinations of parts as may be shown and described in connection with the device herein disclosed by way of examples only and as illustrative of preferred embodiments.

In its essential features the invention consists of a magnetic tracing box comprising a closed container the top of which is transparent and the bottom of which is preferably opaque. Pulverulent or powdery material is enclosed in the container. This material is adapted to move by gravity toward the underside of the top of the container or toward its bottom depending upon the relative positions of its top and bottom. The said material is such that it is adapted to adhere slightly to the underside of the top of the container when dropped thereagainst when the top is inverted relatively to the bottom thereof whereby the top is rendered substantially opaque even if the container is then turned with its top uppermost. Magnetic operating means such as a permanent magnet is provided which is adapted to be moved over the top of the container from the outside thereof whereby at least some of the pulverulent material may be removed from the top of the container along the path of movement of the permanent magnet. The pulverulent or powdery material may consist of a mixture of magnetically attractive and magnetically unattractive material or the pulverulent material may consist of wholly magnetically attractive material. Furthermore, where the pulverulent material is magnetically unattractive, a magnetically attractive member may be placed in the container attractable to the underside of the top of the container and movable therealong in scraping contact by the permanent magnet.

Objects and advantages of the invention will be set forth in part hereafter and in part will be obvious herefrom or may be learned by practicing the invention, the

2 same being realized and attained by means of the instrumentalities and combinations pointed out in the appended claims.

It is an object of the present invention to provide a tracing box on which indicia or other effects may be inscribed on a surface thereof by magnetic functioning means.

A further object of the present invention is to provide a device which may be used as a toy which a child can either play with alone or with other children, either indoors or outdoors.

Another object of the present invention is to provide a device that may be used as an advertising sign, display or the like.

Various further and more specific objects, features and advantages will clearly appear from the detailed description given below taken in connection with the accompanying drawings which form part of this specification and illustrate merely by way of examples certain embodiments of the device of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawing, in which:

DESCRIPTION OF THE PREFERRED EMBODIMENTS

Figure 1:
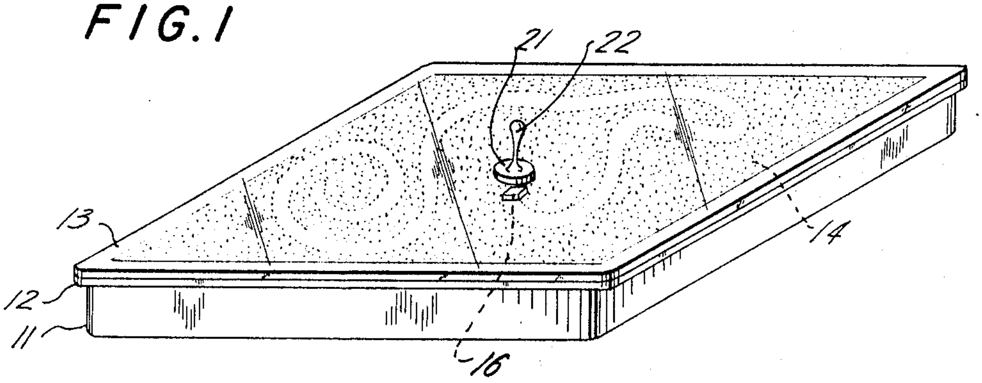
FIG. 1 is a perspective view of a magnetic tracing box according to the invention.

Referring now in more detail to the drawing illustrating preferred embodiments by which the invention may be realized, there is shown in FIGS. 1 to 4 a container or box 11 made of a non-magnetic material, for example plastic or wood. Box 11 has a rim or flange 12 around the upper edge, and a substantially transparent top plate 13 is attached thereto. Top plate 13 is preferably made of plastic or any one of the types of unbreakable glass. The depth of the box 11 may be moderate and contains magnetically unattractive pulverulent material 14 which is adapted to adhere to the inside face 15 of top plate 13. Box 11 also contains at least one magnetically attractive element 16 which is free to move within box 11.

Figure 5:
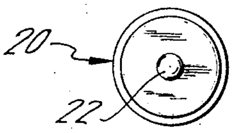
FIG. 5 is a top view of the magnetic operating means.
Figure 6:
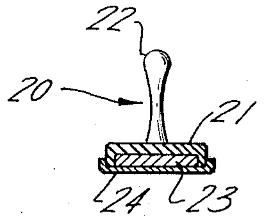
FIG. 6 is a side view of the magnetic operating means shown in FIG. 5, partly in section.

A magnetic operating device 20 is provided to cooperate with element 16. Device 20 may be simply a magnet, or may be constructed as shown in FIGS. 5 and 6 wherein it has a base plate 21 shown as circular in FIGS. 5 and 6 but which may be square, oblong, polygonal or any other desired shape. Extending perpendicularly from base 21 is a finger grip 22. A permanent magnet 23 is set into base plate 21 and is preferably covered with a layer 24 of a material which will not scratch top plate 13 while allowing the magnetic field of magnet 23 to penetrate.

Figure 2:
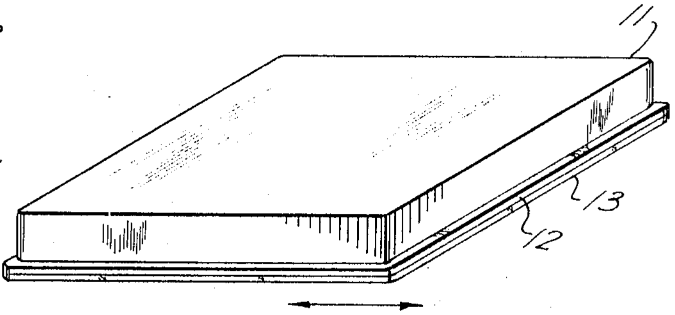
FIG. 2 is a perspective view of the box shown in FIG. 1 being shaken back and forth while upside down to prepare it for use.
Figure 3:
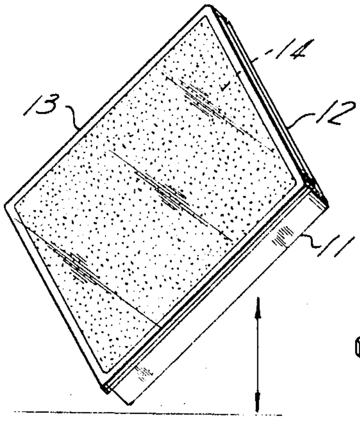
FIG. 3 is a perspective view of the box shown in FIG. 1 being shaken down at a corner to further prepare it for use.
Figure 4:
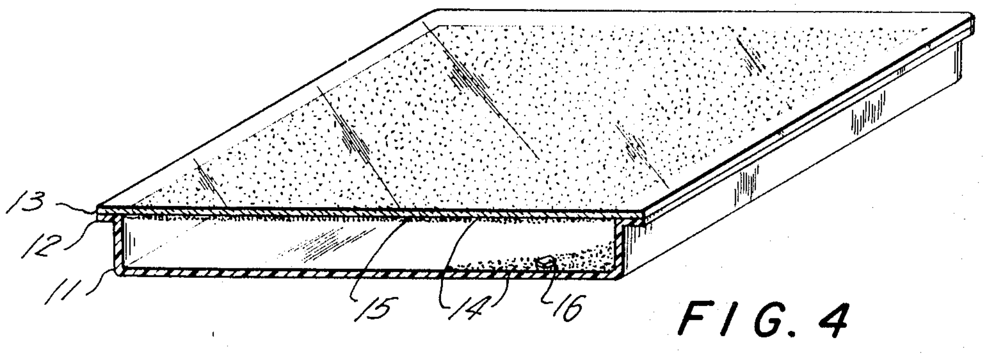
FIG. 4 is a perspective view of the box shown in FIG. 1, partly in section, showing it ready for use.

To prepare the tracing box for use, box 11 is turned upside down and shaken back and forth as indicated in FIG. 2. It is then held so that a corner of box 11 may be tapped against a hard surface, as shown in FIG. 3. The first shaking renders top plate 13 substantially opaque through adherence of pulverulent material 14 on inside surface 15 of top plate 13. The second movement positions element 15 in a corner so that it may be picked up by device 20.

To use the tracing box, device 20 is placed at the corner in which element 16 has been located. Device 20 is then moved by the operator to trace any desired indicia or effect. Since device 20 is magnetic it will attract element 16 to the inside surface 15 of plate 13 and move it along said surface so as to remove through its passage pulverulent material 14 adhering to surface 15 and thus form any desired indicia or effect which is visible from the outside of box 11 and which may be immediately wiped out by turning box 11 upside down and shaking it back and forth.

Figure 7:
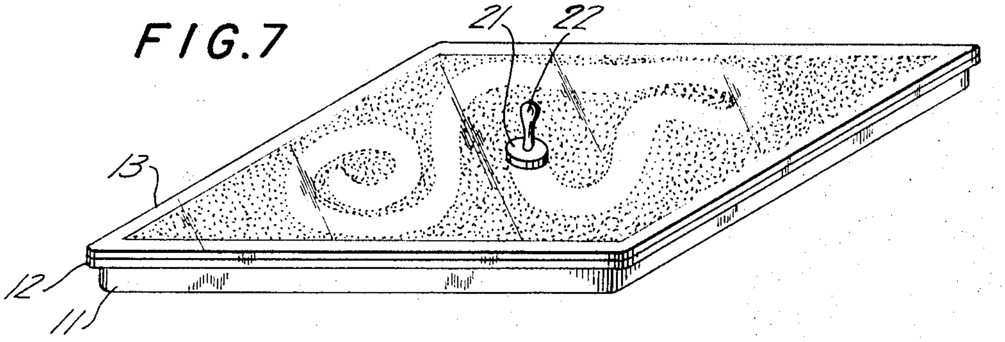
FIG. 7 is a perspective view of a magnetic tracing box which is another embodiment of the invention.
Figure 8:
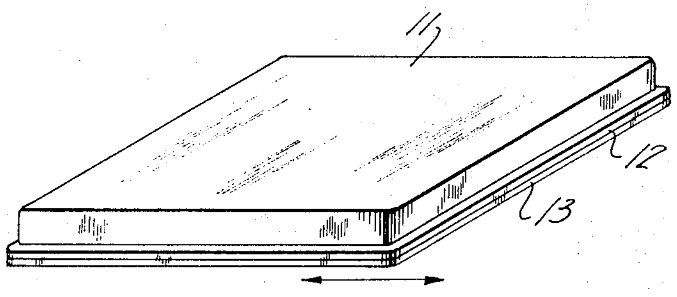
FIG. 8 is a perspective view of the box shown in FIG. 7 being shaken back and forth while upside down to prepare it for use.
Figure 9:
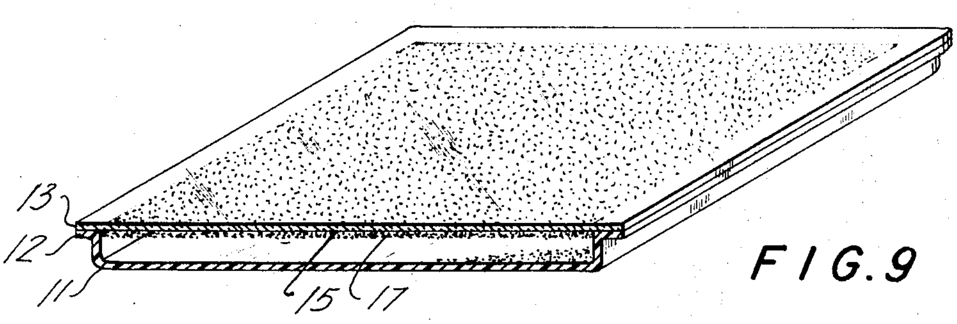
FIG. 9 is a perspective view of the box shown in FIG. 7, partly in section, showing it ready for use.

Another embodiment of the invention is shown in FIGS. 7 to 9. The box is constructed in the same manner as that shown in FIGS. 1 to 4. Pulverulent material 17 is composed of very fine iron filings which may be mixed with magnetically unattractive material which may be colored. Pulverulent material 17 is adapted to adhere to inside surface 15 of plate 13.

To prepare the tracing box for use, box 11 is turned upside down and shaken back and forth as shown in FIG. 8. This renders top plate 13 opaque through the adherence of pulverulent material 17 on inside surface 15 of top plate 13. To use the tracing box, device 20 is placed on top plate 13 and moved by the operator to trace any desired indicia or effect. The iron filings of pulverulent material 17 are moved out of the path of device 20. If there is magnetically unattractive pulverulent material mixed with the iron filings, the filings that are moved from the path of device 20 will remove through their passage the magnetically unattractive material. Indicia or other effects will thus be formed which are visible from the outside of box 11 and which may be immediately wiped out by turning box 11 upside down and shaking it back and forth.

While the invention has been described and illustrated with respect to certain preferred examples which give satisfactory results, it will be understood by those skilled in the art after understanding the principle of the invention, that various changes and modifications may be made without departing from the spirit and scope of the invention and it is intended therefore in the appended claims to cover all such changes and modifications.

What is claimed is:

1. A tracing box comprising a closed container having spaced top and bottom, said top being substantially transparent, pulverulent material in said container disposed to move by gravity toward the underside of said top or toward said bottom depending upon the relative positions of said top and bottom, at least a portion of said pulverulent material being magnetically attractive, said material being disposed to adhere to the underside of said top upon being dropped thereagainst when said top is inverted relatively to said bottom and said container is then turned to a position with its said top uppermost whereby said top is rendered substantially opaque, and magnetic operating means adapted to be moved over said top from outside said container, whereby some of said pulverulent material may be removed from said top along the path of movement of said means.

2. A tracing box according to claim 1 and wherein said pulverulent material comprises a mixture of magnetically attractive and magnetically unattractive material.

3. A tracing box according to claim 1 and wherein said pulverulent material is wholly magnetically attractive.

4. A tracing box according to claim 2 and wherein at least a portion of said pulverulent material is colored.

5. A tracing box according to claim 1, said means being a permanent magnet.

6. A tracing box according to claim 1 and wherein at least a portion of said means being a permanent magnet.

References Cited

UNITED STATES PATENTS

| | | | |
|---|---|---|---|
| 2,480,750 | 8/1949 | Leary | 161—Mag. Dig. |
| 2,853,830 | 9/1958 | Herzog | 46—239 |
| 3,106,042 | 10/1963 | Roethler | 46—240 |
| 3,416,231 | 12/1968 | Mercorelli | 35—66X |

HARLAND S. SKOGQUIST, Primary Examiner

U.S. Cl. X.R.

46—240